United States Patent
Navarro et al.

(10) Patent No.: US 7,039,762 B2
(45) Date of Patent: May 2, 2006

(54) PARALLEL CACHE INTERLEAVE ACCESSES WITH ADDRESS-SLICED DIRECTORIES

(75) Inventors: Jennifer A. Navarro, Poughkeepsie, NY (US); Chung-Lung K. Shum, Wappingers Falls, NY (US); Aaron Tsai, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 10/436,217

(22) Filed: May 12, 2003

(65) Prior Publication Data

US 2004/0230745 A1 Nov. 18, 2004

(51) Int. Cl.
*G06F 12/00* (2006.01)

(52) U.S. Cl. ........................ 711/127; 711/129; 711/140; 711/157

(58) Field of Classification Search ............. None
See application file for complete search history.

(56) References Cited

U.S. PATENT DOCUMENTS

| | | | | |
|---|---|---|---|---|
| 5,497,478 A | * | 3/1996 | Murata | 711/157 |
| 5,559,986 A | * | 9/1996 | Alpert et al. | 711/144 |
| 5,740,402 A | * | 4/1998 | Bratt et al. | 711/157 |
| 5,909,694 A | * | 6/1999 | Gregor et al. | 711/128 |
| 6,446,157 B1 | * | 9/2002 | McGehearty et al. | 711/5 |
| 6,848,023 B1 | * | 1/2005 | Teramoto | 711/127 |

* cited by examiner

*Primary Examiner*—Mano Padmanabhan
*Assistant Examiner*—Paul Baker
(74) *Attorney, Agent, or Firm*—Lynn Augspurger; Cantor Colburn LLP

(57) ABSTRACT

A microprocessor, having interleaved cache and two parallel processing pipelines adapted to access all of the interleaved cache. The microprocessor comprising: a cache directory for each of the parallel processing pipelines wherein each said cache directory is split according to the interleaved cache and interleaving of the cache directory is independent of address bits used for cache interleaving.

20 Claims, 3 Drawing Sheets

PARALLEL CACHE INTERLEAVE ACCESSES WITH ADDRESS-SLICED DIRECTORIES

TECHNICAL FIELD

The present application relates to microprocessor design more particularly, this present application is related to the usage of cache in a superscalar microprocessor.

CROSS REFERENCE TO RELATED APPLICATIONS

This application is also related to United States Patent Application, entitled: SYSTEM AND METHOD FOR SIMULTANEOUS ACCESS OF SAME LINE IN CACHE STORAGE, Ser. No. 10/435,967 filed contemporaneously with this application.

This application is also related to United States Patent Application, entitled: SYSTEM AND METHOD FOR SIMULTANEOUS ACCESS OF SAME DOUBLEWORD IN CACHE STORAGE, Ser. No. 10/436,221 filed contemporaneously with this application.

These co-pending applications and the present application are owned by one and the same assignee, International Business Machines Corporation of Armonk, N.Y. The descriptions set forth in these co-pending applications are hereby incorporated into the present application by this reference.

Trademarks: IBM® is a registered trademark of International Business Machines Corporation, Armonk, N.Y., U.S.A. S/390, Z900 and z990 and other product names may be registered trademarks or product names of International Business Machines Corporation or other companies.

BACKGROUND

A common goal in the design of computer microarchitecture is to increase the speed of execution of a given set of instructions.

To improve processor performance, it is common to interleave a cache by the basic operand blocks (e.g. 64 bits or 1 double word in the L1 cache) and provide fetch or store accesses without incurring the area penalty of a cache array supporting both read and write operations at the same time.

It is also common to have parallel processing pipelines within a cache to support multiple fetch accesses, either to allow superscalar bandwidth in the processor as in the L1 cache, or to process multiple L1 cache miss requests as in the L2 cache. For example, to provide 2 pieces of operand data at each processor cycle, the L1 D-cache structure will generally consists of 2 processing pipelines to handle 2 fetches concurrently. Each processing pipeline will require a lookup into the directory to check the ownership status of the data to be fetched, as required in a multiprocessor system to maintain memory coherency.

A typical L1 D-cache implementation will have either two 1-read-port physical directory arrays (one for each processing pipe), or have one 2-read-ports physical directory array (providing simultaneous access from both pipes). The L1 D-cache array will usually have 2-read-ports to provide the data access bandwidth required. A typical L2 implementation will have directories and caches equally split (usually by line) among the 2 processing pipes, such that each pipe can only access half of any existing L2 cache data.

SUMMARY

In accordance with an exemplary embodiment, a method and apparatus to improve cache access bandwidth is provided. The microprocessor has interleaved cache and two parallel processing pipelines adapted to access the cache. The microprocessor further comprises: a cache directory for each of the parallel processing pipelines wherein interleaving of the cache directory is independent of address bits used for cache interleaving.

In accordance with an exemplary embodiment a method for accessing interleaved cache of a microprocessor is provided. The method comprises the steps of: providing a pair of parallel processing pipelines for accessing the cache; splitting the cache directory according to even and odd line addresses of the cache, wherein the directory corresponding to the even addresses is accessed by one of the pair of parallel processing pipelines and the directory corresponding to the odd addresses is accessed by the other one of the pair of parallel processing pipelines; and providing access to the entire cache by both of the pair of parallel processing pipelines.

DETAILED DESCRIPTION

Figure 1:
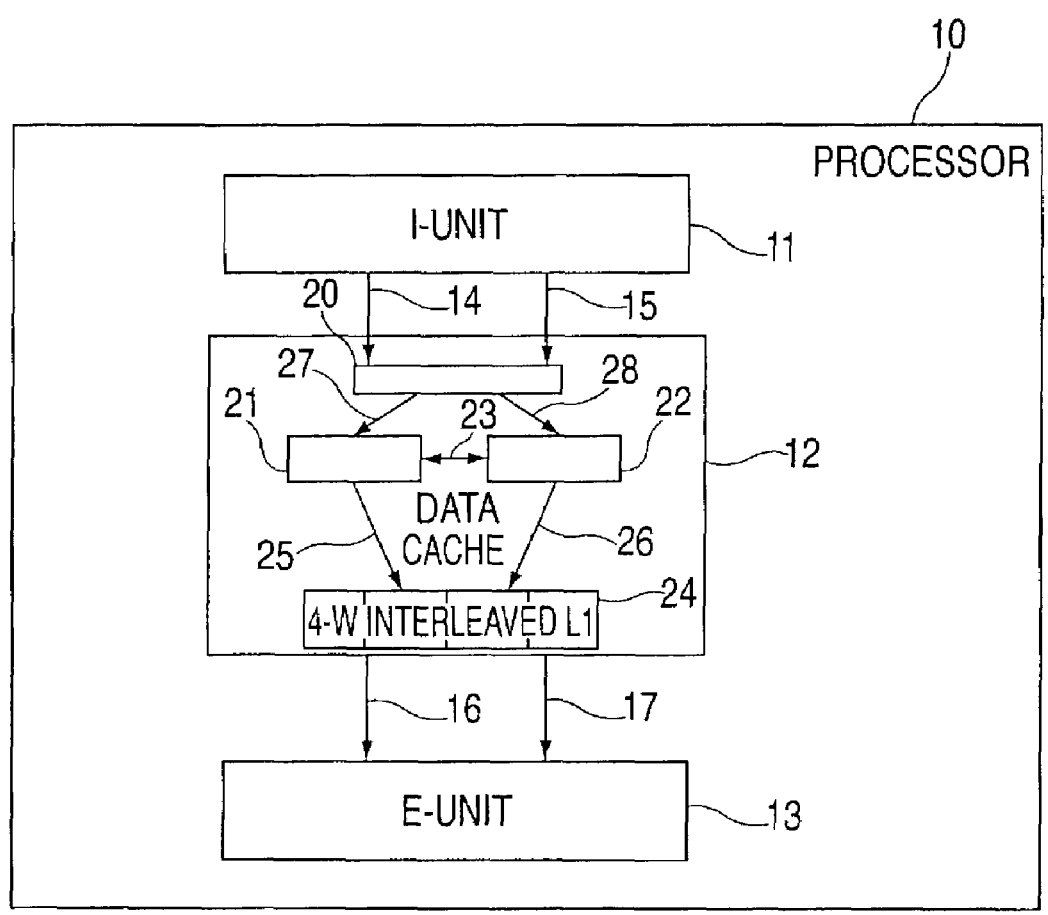
FIG. 1 is a schematic illustration of a processor with an instruction unit (I-unit), a data-cache unit (D-cache unit), and a execution unit (E-unit)

In order to improve processor performance parallel processing pipelines are provided for accessing the cache without incurring significant area increase by not requiring multi-ported arrays. Significant area increase is avoided by splitting the cache directories (one for each processing pipeline) wherein the directories are split between the even and odd address of the cache and data fetches (odd or even) are processed by the corresponding pipeline (odd or even). Each processing pipeline has access to the entire cache to allow for mismatching data fetches (odd fetch on an even pipeline or vice versa) thus two fetches to the same line can be processed at the same time.

Disclosed herein is a microprocessor with an instruction unit (I-unit), an execution unit), and a split L1 instruction and data cache. The instruction unit may issue up to 2 operand requests to the data cache. The data cache can process up to 2 operand requests and send up to 2 operand data to the execution unit. Within the data cache, 2 processing pipelines are interleaved by line address. Each pipeline has a directory that contains half of the data cache lines. The data cache array itself is structured as a 4-way interleave based upon the double word (a 64 operand) address. In addition, the data cache array can be accessed from either pipeline.

A priority unit will determine how current requests from the I-unit and any pending (but not processed) requests are arbitrated into the 2 processing pipelines. When a request is processed in a mismatching pipeline (i.e. their line interleaving address bit value is different than those in the directory), an "implied" fetch processing mechanism may be implemented to improve performance. By comparing the translation lookaside buffer (TLB) indices, TLB hit set Ids, and directory indices, the directory hit information can be imported from the matching pipe to the mismatching pipe. With additional cache indices being compared, the cache data can also be reused from the matching pipe to the mismatching pipe. The design of an exemplary embodiment allows parallel processing pipelines in the data cache without incurring significant area increase by not requiring multi-ported arrays. It also allows for simpler handshaking between the two pipelines to avoid complex controls and cycle-time risks.

In accordance with an exemplary embodiment, the microprocessor has 2 parallel processing pipelines for accessing the L1 cache by splitting the L1 directory into 2 separate directories according to the line addresses (even and odd), each being accessed only by one of the pipelines (even and odd).

The L1 cache, on the other hand, is not split on the line address and is not 2-ported. Instead, the L1 cache is interleaved by the DW addresses (4 ways in an exemplary embodiment) to provide full benefit of L1 interleaving, and to allow parallel accesses if both accesses do not require the same cache interleave. Both processing pipes will have access to all L1 interleaves. Special structure is provided to allow a mismatch directory interleave access, e.g., even line accessing odd directory, to potentially reuse the directory lookup result from the other processing pipe. This is called implied directory access.

The structure of an exemplary embodiment provides 2 parallel directory accesses, using two half directories, without incurring the area penalty of requiring a 2-port directory or two 1-port full directories. Since each processing pipe can access all the L1 cache interleave, the full L1 cache can then be allowed to be interleaved on DW addresses, not on line address bits like the directories, to allow for more performance. The L1 cache is also 1-ported, thus not incurring the area penalty of a 2-ported array.

The described structure is contemplated for use in a future Zarchitecture machine. The processor consists of an Instruction unit, an Execution Unit, and Level 1 split instruction and data cache units.

Referring now to FIG. 1 a processor (10) contemplated for use with an exemplary embodiment is illustrated. The processor (10) comprises an instruction unit (11) which dispatches instructions to an execution unit (13) and issues operand data requests to the D-cache unit (12). As illustrated and in accordance with an exemplary embodiment, 2 operand requests (14, 15) can be issued per cycles. The D-cache unit (12) can return a maximum of 2 operand data, each of 64 bits or 1 double word (DW), to the execution unit (13).

Inside the D-cache unit (12), there exists 2 processing pipes (21, 22) to handle the requested access bandwidth. An arbitration unit (20) determines which request is to be processed by which pipe by prioritizing requests, then sending the requests (27, 28) into the two processing pipes. This particular D-cache array (24) is 4-way interleaved on address bits 59 and 60 (with bit 0 being the most significant bit in an address), allowing higher memory bandwidth to support simultaneous fetch and stores to different interleaves. Both pipes will have handshaking (23) among each other to determine whether they can share look up results among each other.

Figure 2:
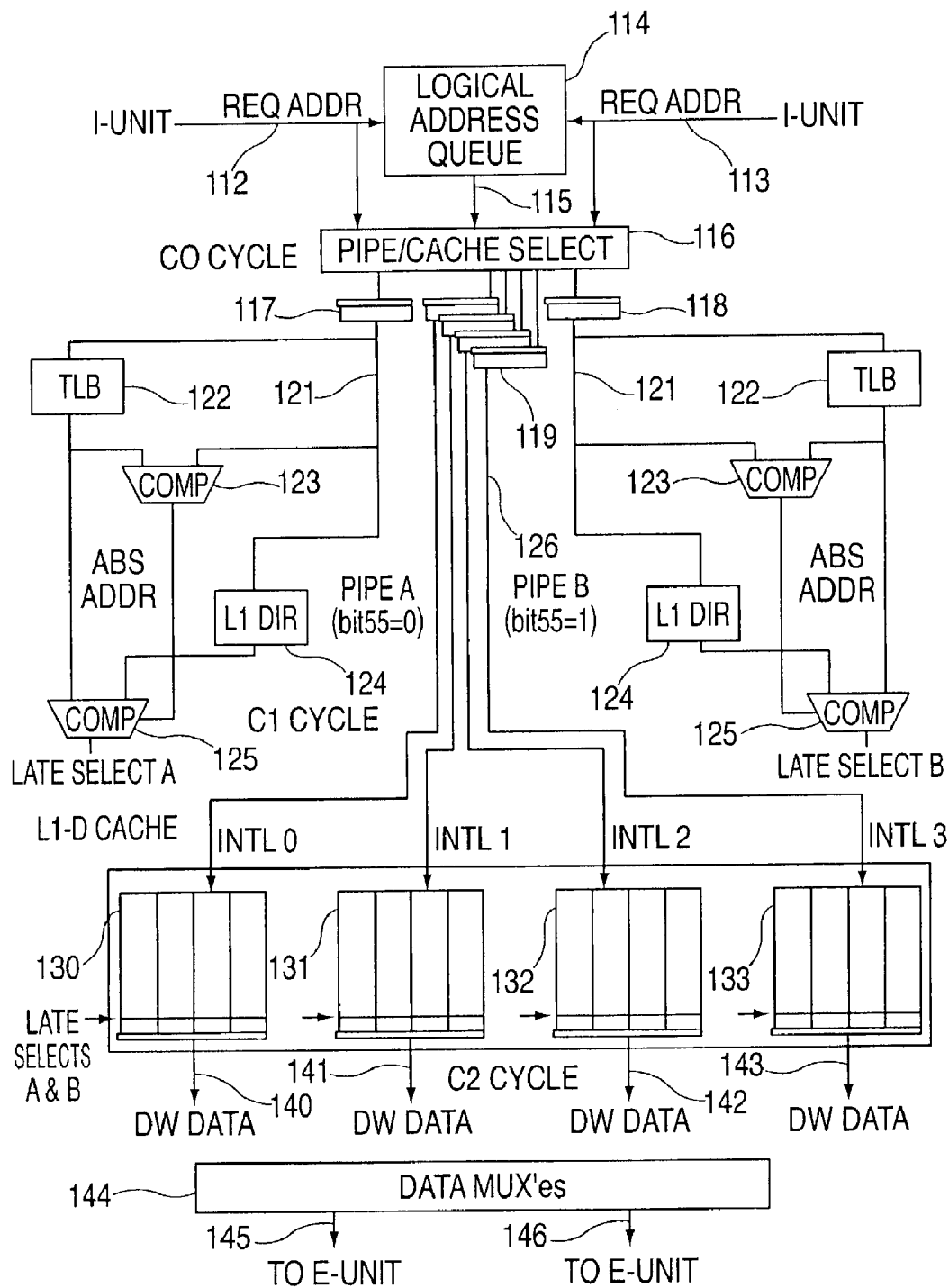
FIG. 2 is a schematic illustration of the data-cache unit.

Referring now to FIG. 2, and in accordance with an exemplary embodiment the details inside the D-cache unit are illustrated. Each pipe contains a dedicated translation lookaside buffer (TLB) and a split directory (DIR) which is absolute address tagged. It also illustrates how each pipe can access any of the 4 way interleaved L1 caches with its directory lookup information, or the other pipe's directory lookup information.

When an I-unit issues its requests (112, 113) to the D-cache unit, it needs to be arbitrated, through a priority unit (116), among themselves and with any previously issued (but pending) requests that is/are stored in the logical queue (114). This priority unit will determine how requests are distributed among the 2 processing pipes through the pipe request registers (117, 118), and among the 4 cache interleaves through the 4 cache request registers (119). Pipe address registers (117, 118) will then be used to look up the TLB (122) and directory (124). The 4 cache request registers (119) will be used to look up data in the 4 L1 cache interleaved arrays.

Each processing pipe has a full translation lookaside buffer (TLB) (122) and a split directory (DIR)(124) which is tagged with absolute addresses. For each request being processed, the virtual address issued from the I-unit will be used for a TLB (122) lookup and a directory (124) lookup through the pipe request registers (117, 118). Since the TLB is 4-way associative, the TLB contents are compared (123) to the virtual address requested to determine which set in the TLB has a hit. Similarly, since the directory is also 4-way associative, the TLB outputs are compared (125) to the directory output to determine which matches there are between the directory set outputs and the TLB set outputs. Results from TLB hit compare (123) and directory hit compare (125) will be combined to generate a late select signal (late select A or late select B).

Any positive indication on the late select signal tells if the requested data exists in the L1 data cache. This late select signal will then be used to select among the 4 sets of data accessed within each L1 data cache interleave. If there is a TLB or directory miss, further processing is required.

In this structure, each pipe has its own physical directory. Each directory (124) contains half of the lines within the L1 cache (130). Since the line size in this processor is 256 bytes, the split between the directories is based on address bit 55 (with bit 0 being the most significant bit in an address). The "A" pipe contains directory information with lines of address bit 55 being 0, while the "B" pipe contains directory information with lines of address bit 55 being 1. After the directory lookup is performed on each pipe, the late set select indications will be sent to all four interleaves (130, 131, 132, 133) from both pipes.

Each L1 cache interleave (130, 131, 132, 133) will be accessed in parallel with the TLB/DIR access through the cache request registers (119). Since each L1 cache interleave (same as DIR) is 4-way associative, one of the 4 accessed data need to be selected to obtain the required data. Therefore, each interleave address register (119) will select one of the late select signals from both pipes by using its value of bit 55. The selected late select signal will then be used to obtain the required cache data from the correct set within each cache interleave. Two buses (145, 146) of these 4 cache interleave data outputs (140, 141, 142, 143) will then be sent to the Execution unit after being selected (144). The selection is predetermined by the priority unit (115).

An example of the operation of an exemplary embodiment is provided as follows: in a particular operation while pipe "A" is processing a request "X" with address bit 55=0, 59:60="00", pipe "B" is processing a request "Y" with address bit 55=1, 59:60="01". The priority unit will determine that request "X" will be issued to pipe "A", and request "Y" will be issued to pipe "B". The cache interleave 0 (130) will then use the late select A for its data select, while cache interleave 1 (131) will use the late select B for its data select. Then output obtained from interleave 0 (140) and 1 (141) will be sent to the execution unit through the data return buses (145, 146).

To further enhance the performance of this L1 data cache, special structure is implemented to allow a pipe to process a request with a mismatching address bit 55. The goal is to allow 2 fetches to the same line or DW to be processed at the same time concurrently. In the priority unit (116), the highest priority request (usually the chronologically oldest request from a program flow point-of-view) will be allowed to go to its desired processing pipe based on its address bit 55, and also has priority to access its desired cache interleave based on its address bit 59,60. If the next request to be picked happens to go to a mismatching pipe (i.e. It's address bit 55 does not match the desired pipe), an "implied" fetch processing occurs to allow it to potentially use the lookup information from the other pipe (which would have been the matching pipe).

Figure 3:
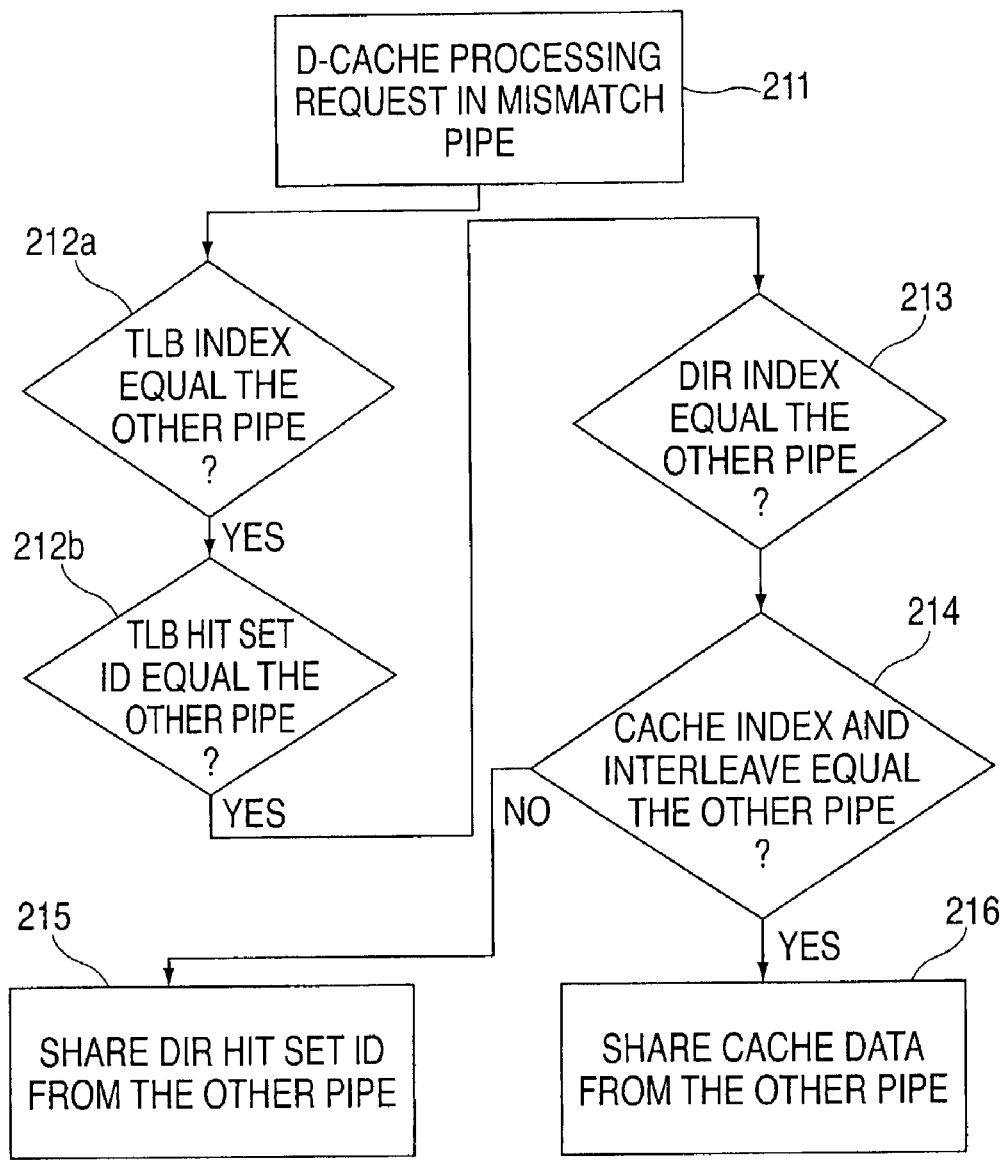
FIG. 3 illustrates a portion of a decision tree used by an algorithm to decide whether a directory hit select and cache data can be shared across pipes.

Referring now to FIG. 3 a portion of an algorithm for allowing an "implied" fetch processing to occur is illustrated. When a request is being processed in a mismatching pipe indicated at (211), its TLB index is compared with that of the other pipe (212a). If this is equal, then the TLB hit set IDs from both pipes are compared at decision node (212b). If this in not equal, the request will be recycled back into the logical queue and waits for the next priority cycle to be steered into the correct pipe. If that is also a match, it is then determined that requests in both pipelines are to the same absolute page address. Then, if the directory indexes are determined to be the same between 2 pipes at decision node (213), then it is determined that requests in both pipelines are to the same absolute line address. If the decision node (213) is false, the request will be recycled back into the logical queue and waits for the next priority cycle to be steered into the correct pipe. If both decisions at (212b) and (213) are true, the fetch going down the mismatch pipe will select the late set select from the matching pipe, and acquire its desired data (215). This works if both addresses are to different interleaves.

If they are to the same interleave, then if the cache indices of both pipes match (214), it is then determined that they are fetching the same DW (216). Therefore, the fetch going down the mismatch pipe will share the data picked by the matching pipe. There are several benefits of this design compared to those of the prior art. This design requires two 1-read-ported half-sized directory arrays, which may be bigger than a single 2 read-ported directory arrays, but are definitely smaller than two 1-read-ported full directory arrays. By segregating the two D-cache pipes by address bit, a lot of required handshaking is removed that would have be required to communicate among the 2 pipelines. This will help in cycle-time alleviation and/or complexity reduction. Allowing cache interleaving on address bits different than the directory interleaving also provides more performance benefits. The design of an exemplary embodiment also allows multiple accesses to the L1 cache array without the use of any 2-ported cache arrays, which would have requires a significantly larger physical area.

The "implied" fetch processing also allows further performance improvements when the two pipelines are fetching the same line or same DW, by allowing mismatch pipe processing.

In one embodiment the structure allows directory interleaving on address bits independent of address bits used for cache interleaving. Each directory look up sends its cache set select result into each cache interleave, the final set select is chosen by its cache index.

In another embodiment the structure allows mismatch directory pipe processing to share the other pipe's directory look up result if they are for the same cache line.

In yet another embodiment the structure also allows mismatch directory pipe processing to share the other pipe's cache look up result if they are for the same cache block (DW).

The parallel processing pipes of an exemplary embodiment each have a TLB index, a TLB hit set ID wherein a directory index compare between the two pipes is provided to determine whether sharing of directory look up results can be done.

The structure of an exemplary embodiment also has a specific cache index compare between the two pipes in order to determine whether sharing of cache interleave result can be done.

It should be appreciated to those skilled in the art that alternate variations can be made on this design by using different set associativities on the TLB and directory, providing more interleaved processing pipes, and choosing different address bits for pipe or cache interleaving.

It should also be appreciated to those skilled in the art that this structure can be applied to any cache structure within a computer system and is not restricted to the L1 D-cache. While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A microprocessor, comprising:
   interleaved cache;
   two parallel processing pipelines each of said two parallel processing pipelines being adapted to access all of said interleaved cache;
   a cache directory for each of said two parallel processing pipelines, one of said cache directories corresponds to a first portion of said interleaved cache and the other one of said cache directories corresponds to a second portion of said interleaved cache wherein interleaving of said cache directory is independent of address bits used for said interleaved cache.

2. The microprocessor as in claim 1, wherein said interleaved cache is L1 cache and each said cache directory is split according to the even and odd line addresses of said interleaved cache and said interleaved cache is not two ported.

3. The microprocessor as in claim 1, wherein said interleaved cache is interleaved by double word addresses of said interleaved cache and access is provided to the entire interleaved cache by each of said parallel processing pipelines.

4. The microprocessor as in claim 1, further comprising:
   a translation lookaside buffer (TLB) for each of said parallel processing pipelines.

5. The microprocessor as in claim 4, further comprising: a pipe register for each of said parallel processing pipelines wherein a cache set select result is generated by each cache request by said parallel processing pipelines, said cache set select result is sent into each cache interleave, wherein a final set select is chosen by a corresponding cache index.

6. The microprocessor as in claim 5, further comprising an instruction unit, an execution unit and a D-cache unit wherein the D-cache unit comprises said interleaved cache and the instruction unit dispatches instructions to said execution unit and two operand requests can be issued by said instruction unit per cycle of the microprocessor.

7. The microprocessor as in claim 6, wherein said D-cache unit can return a maximum of two operand-data to said execution unit each of said two operand data being one double word.

8. The microprocessor as in claim 1, wherein one of said parallel processing pipelines is able to share the other one of said parallel processing pipe's directory's look up result if the requests on said parallel processing pipes are determined to be for the same cache line of said interleaved cache.

9. The microprocessor as in claim 1, wherein one of said parallel processing pipelines is able to share the other one of said parallel processing pipeline's directory's look up result if the requests on said parallel processing pipelines are determined to be for the same cache block of said interleaved cache.

10. The microprocessor as in claim 9, further comprising: means for determining if said parallel processing pipelines look up results are for the same cache block of said interleaved cache.

11. The microprocessor as in claim 8, further comprising means for determining if said parallel processing pipelines look up results are for the same cache line of said interleaved cache.

12. The microprocessor as in claim 4, wherein the microprocessor further comprises: a specific TLB index compare, a TLB set ID compare, and a directory index compare each being configured to communicate with said two parallel processing pipes in order to determine whether sharing of a late select result can be facilitated.

13. The microprocessor as in claim 12, further comprising: a specific cache index compare being configured to communicate with said two parallel processing pipes in order to determine whether sharing of a cache interleave result can be facilitated.

14. The microprocessor as in claim 1, further comprising: a full translation lookaside buffer (TLB), a split directory (DIR) being absolute address tagged to said interleaved cache, a TLB index, a TLB hit set ID; and a directory index that is configured to compare a look up results of each of said two parallel processing pipes to determine whether sharing of a directory look up result between each of said two parallel processing pipes can be done.

15. The microprocessor as in claim 14, wherein said full translation lookaside buffer (TLB), said split directory (DIR), said interleaved cache and said TLB index are each four way associative.

16. A method for accessing interleaved cache of a microprocessor, comprising:
providing a pair of parallel processing pipelines for accessing the interleaved cache;
splitting a cache directory of the interleaved cache according to even and odd line addresses of the interleaved cache, wherein a cache directory corresponding to said even addresses is accessed by one of said pair of parallel processing pipelines and a cache directory corresponding to said odd addresses is accessed by the other one of said pair of parallel processing pipelines; and
providing access to the interleaved cache by both of said pair of parallel processing pipelines.

17. The method as in claim 16, further comprising:
determining which of said pair of parallel processing pipelines is to be used for accessing the interleaved cache by determining if a requested address bit is even or odd.

18. The method as in claim 17, further comprising:
allowing a mismatched address bit to be processed by one of said pair of parallel processing pipelines by determining if said mismatched address bit is requesting a portion of the interleaved cache that is the same as the other one of said pair of parallel processing pipelines.

19. A method of accessing cache of a processor, comprising:
interleaving the cache of the processor;
interleaving a cache directory of the processor;
providing a pair of parallel processing pipelines each being able to access any portion of the cache, each of said pair of parallel processing pipelines having a cache directory comprising a portion of the interleaved cache directory;
wherein the interleaving of the cache directory is on a different address bit than the address bit of the interleaving of the cache.

20. A microprocessor, comprising:
an instruction unit,
an execution unit; and
a data cache unit, said instruction unit issues instructions to said execution unit and said instruction unit issues operand data requests to said data cache unit, said data cache unit comprises:
two parallel processing pipelines adapted to process operand data requests, each of said two parallel processing pipelines having a pipe address register accessing a full translation lookaside buffer and a split directory of an interleaved L1 cache; and
cache request registers for looking up data in said interleaved L1 cache;
wherein each said split directory is addressed independent of address bits used for said interleaved L1 cache.

* * * * *